UNITED STATES PATENT OFFICE.

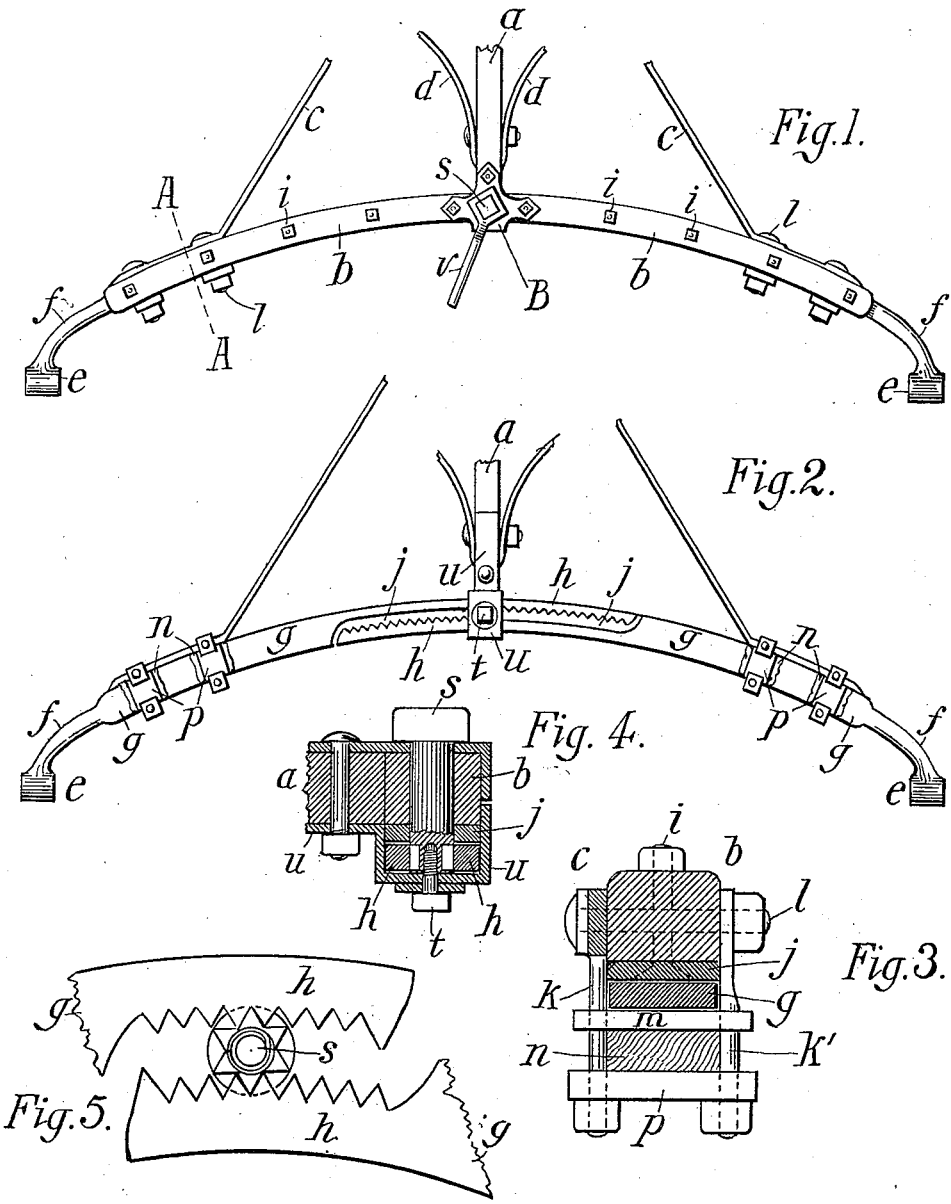

JOSEPH T. CLARKSON, OF AMESBURY, ASSIGNOR OF ONE-HALF TO FRANK A. BABCOCK, OF SALISBURY, MASSACHUSETTS.

SHIFTING POLE FOR VEHICLES.

SPECIFICATION forming part of Letters Patent No. 300,848, dated June 24, 1884.

Application filed February 9, 1884. (No model.)

*To all whom it may concern:*

Be it known that I, JOSEPH T. CLARKSON, of Amesbury, in the county of Essex and State of Massachusetts, have invented a new and useful Improvement in Shifting Poles for Vehicles, which will, in connection with the accompanying drawings, be hereinafter fully described, and specifically defined in the appended claims.

This invention relates to that class of light carriage-poles which are interchangeable with carriage-shafts, whereby the same vehicle may be harnessed to either one or two horses, as may be desired; and the invention consists in the construction and combination of the divers devices embodied therein, as will, in connection with the accompanying drawings, be hereinafter more particularly and fully described and claimed.

In said drawings, Figure 1 is a top or plan view of the rear portion of the pole and connections. Fig. 2 is an inverted plan or under side view of Fig. 1. Fig. 3 is a transverse section taken as on line A A, Fig. 1, and as looking to the right in said figure. Fig. 4 is a section, as on line B, through the cross-bar and the rear part of the pole. Fig. 5 is a detached enlarged under side view, showing the central portion of parts shown in Fig. 2.

In said views, $a$ represents the pole, and $b$ the usual curved cross-bar secured transversely thereto. Said cross-bar is re-enforced by a plate of metal, (shown at $j$, Figs. 3, 4,) which is secured to $b$ by the countersunk headed bolts $i$, secured by screw-nuts seated upon the top of the bar, as shown in Figs. 1, 3. Said cross-bar is also strengthened by the usual stays, $c$, which at their respective ends are secured to said bar and the pole, and are supported by the branches $d$, also secured to the pole. The eyes $e$, by which the pole is attached to the shackles of the carriage, are formed with the usual rounded shank or arm, $f$, which merges into a broadened plate, $g$, which latter at its inner portion is reduced to one-half its width, as at $h$, and at the inwardly-facing edges are formed with teeth, which are engaged by corresponding teeth cut upon the lower portion of stud $s$, which is inserted in bar $b$ at the junction of the pole therewith. Said stud is secured in place by screw $t$, which screw is threaded in the lower end of said stud, as shown. Plates $g$ are held in contact with plate $j$ by the devices more clearly shown in Fig. 3, where a strap-bolt, $k$, is shown as formed on stay $c$, while a similar strap-bolt, $k'$, is secured on bolt $l$, and a bar, $m$, through which bolts $k$ $k'$ pass, bears against plate $g$, while a plate of rubber, $n$, seated on plate $m$, is compressed thereon with the requisite force by yoke $p$, secured on said bolts $k$ $k'$ by screw-nuts, as shown, by which devices a pressure of plates $g$ against re-enforce $j$ of the requisite degree and of elastic nature is secured, that prevents vibration or rattling of plates $g$, yet allows their being lineally actuated by means of stud $s$ and a wrench, $v$, when applied thereon, to adjust eyes $e$ at the requisite distance apart to enter the shackles secured upon the axle of the vehicle. At the center of bar $b$ the toothed portion $h$ of plates $g$ are held against re-enforce plate $j$ by plate $u$ and stud $s$, with its securing-screw $t$, as shown in Figs. 2 and 4. By my invention the distance apart of eyes $e$ can be readily adjusted by merely applying a wrench to stud $s$ and rotating the same in the proper direction, and this without disturbance of any of the other parts.

Instead of rubber $n$, a short curved steel spring may be arranged between yoke $p$ and bar $m$ to hold plate $g$ firmly but not rigidly against re-enforce $j$; or, if preferred, such steel spring may be arranged directly between said yoke $p$ and plate $g$ without the intervention of bar $m$, which latter is required when rubber $n$ is employed to prevent the abrasion thereof when plates $g$ are lineally actuated as described.

I claim as my invention—

1. In a shifting carriage-pole, the combination of plates $g$, having their outer ends formed to be secured to the carriage-shackles, and at their inner ends with racks $h$, and a toothed stud, $s$, arranged to engage said racks and lineally actuate said plates, substantially as specified.

2. In a shifting carriage-pole, the combination of plates $g$, formed with racks $h$, toothed stud $s$, arranged to engage said racks, confining-plate $u$, and securing-screw $t$, substantially as specified.

3. In a shifting carriage-pole, the combination of re-enforce plate $j$, secured to bar $b$, adjustable plates $g$, strap-bolts $k$ $k'$, bars $m$, elastic blocks $n$, and yokes $p$, arranged to confine the same, and by means of the securing-nuts compress said blocks to the required degree, substantially as specified.

4. In a shifting carriage-pole, the shackle engaging plates $h$, formed at their inner ends with rack-like teeth, and a toothed stud or pinion arranged between said racks, to be rotated, and to thereby simultaneously move said racks inward or outward, as required, substantially as specified.

5. In a shifting carriage-pole, the shackle engaging plates $h$, adjustably secured upon bar $b$, and arranged and provided with means whereby they may be simultaneously moved to adjust their ends $e$ at the required distance apart, substantially as specified.

6. In an adjustable carriage-pole, the combination, with bar $b$ and its re-enforce plate $j$, of lineally-adjustable plates $g$, with devices to hold them in contact with plate $j$ by an elastic pressure, substantially as specified.

JOSEPH T. CLARKSON.

Witnesses:
JAS. W. TAYLOR,
GEORGE H. BRIGGS.